(12) United States Patent
Yamane et al.

(10) Patent No.: US 10,571,357 B2
(45) Date of Patent: Feb. 25, 2020

(54) LEAK CHECK SYSTEM AND METHOD OF CHECKING LEAK USING THE SAME

(71) Applicant: KAWASAKI JUKOGYO KABUSHIKI KAISHA, Kobe-shi, Hyogo (JP)

(72) Inventors: Hideshi Yamane, Kakogawa (JP); Jun Takebayashi, Kakokawa (JP); Shuhei Kuraoka, Akashi (JP); Tatsuhiro Uto, Akashi (JP); Shinichi Fujisawa, Ashiya (JP); Hiroyuki Mizumoto, Kobe (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 67 days.

(21) Appl. No.: 15/576,304

(22) PCT Filed: May 16, 2016

(86) PCT No.: PCT/JP2016/002385
§ 371 (c)(1),
(2) Date: Nov. 22, 2017

(87) PCT Pub. No.: WO2016/189824
PCT Pub. Date: Dec. 1, 2016

(65) Prior Publication Data
US 2018/0143098 A1    May 24, 2018

(30) Foreign Application Priority Data
May 22, 2015    (JP) ................................. 2015-104851

(51) Int. Cl.
*G01M 3/26* (2006.01)
*B25J 13/08* (2006.01)

(52) U.S. Cl.
CPC ............. *G01M 3/26* (2013.01); *B25J 13/085* (2013.01); *Y10S 901/44* (2013.01); *Y10S 901/46* (2013.01)

(58) Field of Classification Search
CPC .... G01M 3/26; G01M 3/2815; G01M 3/2838; B25J 13/085; Y10S 901/44; Y10S 901/46
(Continued)

(56) References Cited

U.S. PATENT DOCUMENTS

2007/0151329 A1    7/2007  Thomas et al.
2007/0157714 A1    7/2007  Rankin et al.
(Continued)

FOREIGN PATENT DOCUMENTS

JP    H11-194065 A    7/1999
JP    3407630 B2      5/2003
(Continued)

OTHER PUBLICATIONS

Jul. 19, 2016 Search Report issued in International Patent Application No. PCT/JP2016/002385.
(Continued)

*Primary Examiner* — Suman K Nath
(74) *Attorney, Agent, or Firm* — Oliff PLC

(57) ABSTRACT

A leak check system is provided, which supplies air to inspection target space that an object to be inspected has and checks leak based on a pressure change of inspection target space. System includes pedestal, robotic arm including plurality of arm bodies serially coupled from pedestal, robot control device configured to control operation of robotic arm, air supply hand, having air discharge part connected to object to be inspected to discharge air into inspection target space, and attachably and detachably attached to a tip-end part of robotic arm, air supply source, air supply pipe configured to lead air from air supply source to air discharge
(Continued)

part, pressure sensor, provided to air supply pipe, and configured to send detected pressure data to robot control device, and air supply mechanism of which supply of air from air supply source to air discharge part is controlled by robot control device.

5 Claims, 5 Drawing Sheets

(58) Field of Classification Search
USPC .............................. 73/40, 40.5 R, 49.1, 49.5
See application file for complete search history.

(56) References Cited

U.S. PATENT DOCUMENTS

| 2015/0135803 | A1* | 5/2015 | Halliwill | G01M 3/16 |
| | | | | 73/40 |
| 2016/0052134 | A1* | 2/2016 | Kossmann | B25J 9/1687 |
| | | | | 29/428 |

FOREIGN PATENT DOCUMENTS

| JP | 2007-183261 A | 7/2007 |
| JP | 4951328 B2 | 6/2012 |

OTHER PUBLICATIONS

Feb. 6, 2017 Office Action issued in Taiwanese Patent Applicaton No. 105115717.

* cited by examiner

LEAK CHECK SYSTEM AND METHOD OF CHECKING LEAK USING THE SAME

TECHNICAL FIELD

The present disclosure relates to a leak check system, and particularly to a leak check system which supplies pressurized air to an object to be inspected and checks the leak from the object to be inspected, and a method of checking leak using the system.

BACKGROUND ART

In a production line where products are manufactured, a leak check for checking leak from, for example, an oil container and a cooling channel of an assembled product is performed. Conventionally, as one method of checking the leak, a method of supplying pressurized air (hereinafter, simply referred to as "air") to an inspection target space of an object to be inspected, monitoring a pressure change after the lapse of a given period of time, and checking the leak, has been known.

Such a leak check operation is generally performed manually by a worker using a leak tester, and a leak check system which is automated using an articulated robot or an actuator is also known, for example, like Patent Document 1.

As illustrated in FIG. 5, Patent Document 1 discloses a leak check system 200 for checking leak from a cooling-water passage of an engine 210. The cooling-water passage of the engine 210 which is the object to be inspected has a plurality of openings, such as an entry-side opening 211, an opening 212 for water drain, and an exit-side opening 213. The leak check system 200 connects an arm part 205 for fluid supply with the exit-side opening 213 in a state where the entry-side opening 211 and the opening 212 for water drain are blocked by seal parts 203 and 204 provided to an arm part 201 and a slide base 202, and supplies air to the inspection target space. Determinations of the existences of supply and leak of air are performed by a leak testing machine 206 and a leak testing machine controller 207 which controls the leak testing machine 206. Moreover, a control for operating the arm part 205 for fluid supply opposing to the exit-side opening 213 is performed by a robotic arm controller 208.

REFERENCE DOCUMENT OF CONVENTIONAL ART

Patent Document

[Patent Document 1] JP1999-194065A

DESCRIPTION OF THE DISCLOSURE

Problems to be Solved by the Disclosure

However, in the leak check system 200 illustrated in FIG. 5, many elements which constitute the leak check system 200 exist, such as the mechanical elements 201 and 202 for blocking the openings 211 and 212 which the object to be inspected has, the leak testing machine 206 and the leak testing machine controller 207 which controls the leak testing machine 206, and the robotic arm controller 208. Thus, the entire system, especially a control system which controls each element of the system, has a complicated structure.

Therefore, one purpose of the present disclosure is to provide a simplified leak check system and a method of checking leak using the system.

Summary of the Disclosure

In order to solve the problem, according to one aspect of the present disclosure, a leak check system is provided, which supplies air to an inspection target space that an object to be inspected has and checks leak based on a pressure change of the inspection target space. The system includes a pedestal, a robotic arm including a plurality of arm bodies serially coupled from the pedestal, a robot control device configured to control operation of the robotic arm, an air supply hand, having an air discharge part connected to the object to be inspected to discharge air into the inspection target space, and attachably and detachably attached to a tip-end part of the robotic arm, an air supply source, an air supply pipe configured to lead air from the air supply source to the air discharge part, a pressure sensor, provided to the air supply pipe, and configured to send detected pressure data to the robot control device, and an air supply mechanism of which supply of air from the air supply source to the air discharge part is controlled by the robot control device. The robot control device determines the leak from the inspection target space based on the pressure data.

According to this configuration, the function of controlling the air supply to the inspection target space and the function of determining the leak which are conventionally a responsibility of a leak tester are now a responsibility of the robot control device. Thus, a simplified leak check system is achieved.

In the leak check system, the object to be inspected may have a plurality of openings which communicate the inspection target space with the exterior. The plurality of openings may include a first opening to which the air discharge part is connected, and other second openings. The system may include a plug attachment-and-detachment hand, attachably and detachably attached to the tip-end part of the robotic arm, and configured to attach a plug that blocks a second opening to the second opening. According to this configuration, a series of leak check operations which first includes a blocking operation of the second opening that the object to be inspected has, and also includes a connection of the air discharge part to the first opening, an air supply to the inspection target space, a monitoring of the internal pressure of the inspection target space, and a determination of the leak, are executable with control signals from the robot control device.

The leak check system is especially useful when the object to be inspected has a plurality of inspection target spaces.

The object to be inspected is, for example, an articulated robot, and the inspection target space is, for example, an internal space of a grease bath that the articulated robot has.

In addition, according to one aspect of the present disclosure, a method of checking leak from the object to be inspected having a plurality of openings that communicate the inspection target space with the exterior by using the leak check system described above is provided. The method includes controlling the robotic arm by the robot control device to connect the air discharge part to one of the plurality of openings, controlling the air supply mechanism by the robot control device to start discharging of air from the air discharge part to the inspection target space, and determining leak from the inspection target space by the robot control device based on pressure data sent from the pressure sensor.

The method may further include, before connecting the air discharge part to the first opening that is the one opening, controlling the robotic arm by the robot control device for the second opening that is an opening of the plurality of openings other than the first opening to attach to the tip-end part of the robotic arm, the plug attachment-and-detachment hand configured to attach the plug that blocks the second opening to the second opening, controlling the robotic arm by the robot control device to attach the plug to the second opening, and controlling the robotic arm by the robot control device to replace the hand attached to the tip-end part of the robotic arm from the plug attachment-and-detachment hand to the air supply hand.

Effect of the Disclosure

According to the present disclosure, the simplified leak check system and the method of checking leak using the system are provided.

MODE FOR CARRYING OUT THE DISCLOSURE

Figure 1:
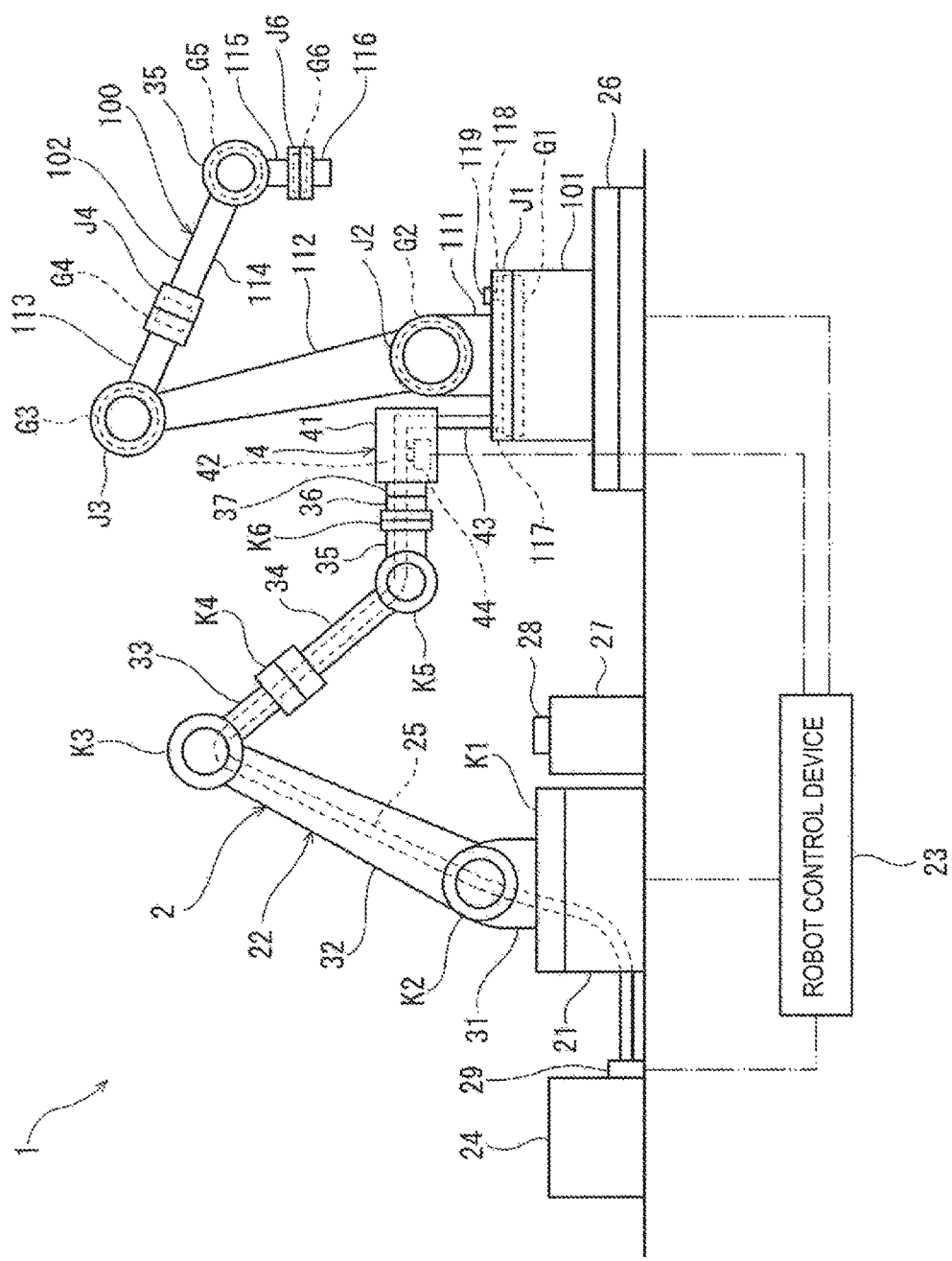
FIG. 1 is a structural view schematically illustrating a leak check system according to one embodiment of the present disclosure.

Hereinafter, one embodiment of the present disclosure is described with reference to the accompanying drawings. FIG. 1 is a structural view schematically illustrating a leak check system 1 according to one embodiment of the present disclosure. The leak check system 1 is incorporated into a production line, for example. Below, the leak check system 1 is incorporated into the production line where articulated robots 100 as illustrated on the right side of FIG. 1 are manufactured as one example, and is described as for a leak check being carried out to the articulated robot 100 which serves as an object to be inspected.

First, the articulated robot 100 which is the object to be inspected of the leak check system 1 of this embodiment is described. As illustrated in FIG. 1, the articulated robot 100 includes a pedestal 101 and a robotic arm 102 coupled to the pedestal 101. The robotic arm 102 includes six arm bodies 111-116, such as a first arm body 111, a second arm body 112, a third arm body 113, a fourth arm body 114, a fifth arm body 115, and a sixth arm body 116. The arm bodies 111-116 are serially coupled in this order from the pedestal 101. That is, the first arm body 111 is coupled to the pedestal 101 at a base-end part, the second arm body 112 is coupled to a tip-end part of the first arm body 111 at a base-end part, and similarly for the rest, the sixth arm body 116 is coupled to a tip-end part of the fifth arm body 115 at a base-end part. A tip-end part of the robotic arm 102, i.e., a tip-end part of the sixth arm body 116 is constructed so that a hand for performing given operations, such as a welding operation and a painting operation etc. is detachable and attachable.

The articulated robot 100 includes a plurality of joint parts J1-J6. Each of the joint parts J1-J6 rotatably couples one member of two adjacent members among the pedestal 101 and the arm bodies 111-116 which are serially coupled, which is disposed opposite from the pedestal 101, to the other member disposed toward the pedestal 101. In this embodiment, since the total number of the pedestal 101 and the arm bodies 111-116 is seven, the number of pairs of the adjacent members is six and the number of the joint parts J1-J6 is also six.

Mechanical elements (not illustrated), such as a transmission and bearings, are incorporated into each of the joint parts J1-J6. In order to smoothly operate the mechanical elements, grease baths G1-G6 for sealing grease as lubricant are provided to the joint parts J1-J6, respectively. Leak from each of the grease baths G1-G6 is checked by the leak check system 1 so that grease supplied thereto does not leak. That is, an inspection target space which is checked of leak by the leak check system 1 according to this embodiment includes internal spaces of the grease baths G1-G6.

The grease baths G1-G6 have a plurality of openings which communicate with the exterior, respectively. The leak check system 1 described later supplies air into the grease baths G1-G6 from one of the plurality of openings (hereinafter, referred to as a "first opening") 117 which the grease baths G1-G6 have, respectively, monitors internal pressures, and checks the leaks. The leak check system 1 according to this embodiment supplies, at the time of the leak check, air to the grease baths G1-G6 from the first opening 117 in a state where openings 118 other than the first opening 117 (hereinafter, referred to as "the second openings") of the plurality of openings which the grease baths G1-G6 have are blocked. That is, the body to be inspected according to this embodiment has, for every inspection target space, the first opening 117 used as an inlet into which air is supplied at the time of the leak check, and other second openings 118. Note that, in FIG. 1, only one first opening 17 and only one second opening 118 which the grease bath G1 has are illustrated, and the rest of the openings are omitted for simplification. Moreover, below, when one arbitrary grease bath is indicated, it is referred to as a "grease bath G."

Next, a structure of the leak check system 1 is described. The leak check system 1 includes an articulated robot 2 as illustrated on the left side of FIG. 1, and a robot control device 23 which controls operation of the articulated robot 2.

As illustrated in FIG. 1, the articulated robot 2 includes a pedestal 21 and a robotic arm 22 coupled to the pedestal 21. The robotic arm 22 includes six arm bodies 31-36, such as a first arm body 31, a second arm body 32, a third arm body 33, a fourth arm body 34, a fifth arm body 35, and a sixth arm body 36, and the am bodies 31-36 are serially coupled in this order from the pedestal 21. That is, the first arm body 31 is coupled at a base-end part to the pedestal 21, the second arm body 32 is coupled at a base-end part to a tip-end part of the first arm body 31, and similarly for the rest, the sixth arm body 36 is coupled at a base-end part to a tip-end part of the fifth arm body 35.

The articulated robot 2 of the leak check system 1 includes a plurality of joint parts K1-K6 similar to the articulated robot 100 which is the object to be inspected. The joint parts K1-K6 have a drive motor 38 (see FIG. 3) which rotates one of adjacent two members among the pedestal 21 and the arm bodies 31-36 which are serially coupled, which is disposed opposite from the pedestal 21, with respect to the other member disposed toward the pedestal 21, respectively. The drive motor 38 is a servo motor, for example. Moreover, the joint parts K1-K6 have a rotation sensor 39 (see FIG. 3) which detects a rotational state of the arm body (31-36) rotated by the drive motor 38, respectively. The rotation sensor 39 is an encoder, for example.

Although a case where the pedestal 21 is fixed to a horizontal floor surface of an operation field is illustrated in FIG. 1, it may be installed on a non-horizontal surface, or may be suspended from above, or may be movably installed. Moreover, in FIG. 1, although a so-called vertically articulated 6-axis robot is illustrated as the articulated robot 2 of the leak check system 1, it is merely an example and is suitably applicable to other types of robots.

A holding part 37 for holding a hand which performs a given operation is provided to a tip-end part of the robotic arm 22, i.e., to a tip-end part of the sixth arm body 36 so that the hand is replaceably attached to the robotic arm 22 by the holding part 37. In the process where air is supplied to the grease bath G in the leak check operation, and in the process where the internal pressure of the grease bath G is monitored to determine the leak, an air supply hand 4 which supplies air to the grease bath G is attached to the holding part 37. Moreover, before supplying air to the grease bath G in the leak check operation, a plug attachment-and-detachment hand 28 is attached to the holding part 37 in order to attach a blocking plug 119 which blocks the second opening 118, to the second opening 118. Before the air supply hand 4 and the plug attachment-and-detachment hand 28 are attached to the robotic arm 22, they are accommodated in a hand holder 27 disposed within an operating range of the robotic arm 22. The air supply hand 4 and the plug attachment-and-detachment hand 28 are exchangeably attached to the holding part 37 on the hand holder 27. Note that, in FIG. 1, one blocking plug 119 corresponding to the illustrated second opening 118 is illustrated.

Moreover, the leak check system 1 includes an inspection table 26 on which the articulated robot 100 as the object to be inspected is placed. The inspection table 26 is a turntable constructed to rotate centering on a vertical rotation axis, and has a rotation mechanism (not illustrated). The rotation of the inspection table 26 is controlled by the robot control device 23.

The leak check system 1 includes an air supply source 24, and an upstream air supply pipe 25 which connects the air supply source 24 to the air supply hand 4. The upstream air supply pipe 25 extends from the air supply source 24 to the pedestal 21, and further extends from the pedestal 21 to the holding part 37 along the robotic arm 22. Note that, herein, in the supply channel through which air is supplied from the air supply source 24 to the space to be inspected (grease bath G), the air supply source 24 side is referred to as "upstream" and the space to be inspected side is referred to as "downstream."

Moreover, the leak check system 1 includes an air supply mechanism 29 of which the air supply to the air supply hand 4 is controlled by the robot control device 23. The air supply mechanism 29 is, for example, an on-off valve, and is provided to the air supply source 24, the upstream air supply pipe 25, or a downstream air supply pipe 42 which is described later.

Figure 2:
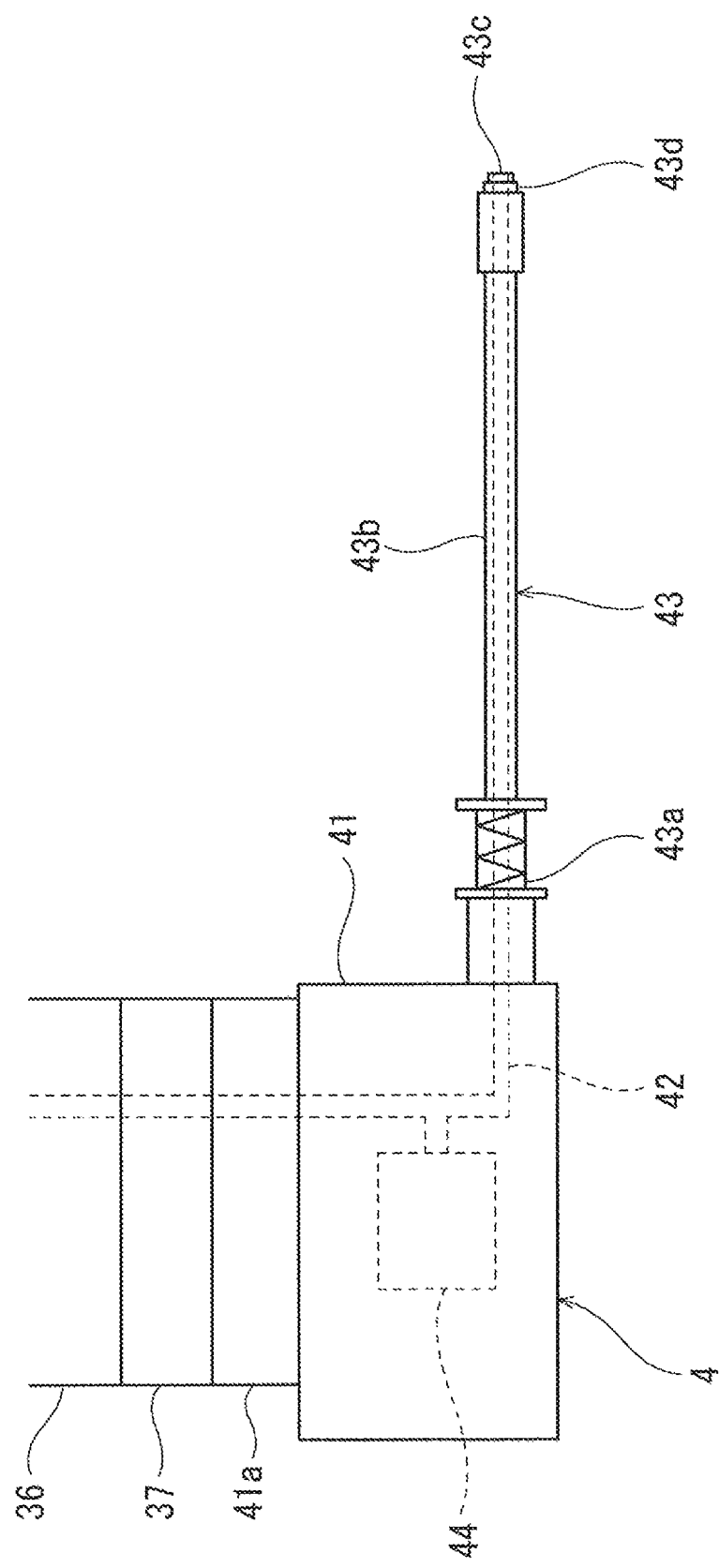
FIG. 2 is a side view schematically illustrating an air supply hand.

FIG. 2 is a side view schematically illustrating the air supply hand 4 held by the holding part 37 of the robotic arm 22. The air supply hand 4 includes an exterior frame 41, the downstream air supply pipe 42, an air discharge part 43, and a pressure sensor 44.

A part 41a to be held, which is held by the holding part 37 of the robotic arm 22, is provided to the exterior frame 41. The exterior frame 41 supports the downstream air supply pipe 42, the air discharge part 43, and the pressure sensor 44.

The downstream air supply pipe 42 is connected to the upstream air supply pipe 25 when the part 41a to be held is held by the holding part 37. The downstream air supply pipe 42 is supported by the exterior frame 41. The "air supply pipe" of the present disclosure is comprised of the upstream air supply pipe 25 and the downstream air supply pipe 42.

The air discharge part 43 is formed in a pipe shape, and is coupled to the downstream air supply pipe 42 at an opening of one end thereof. In the process where air is supplied to the inspection target space in the leak check operation, the air discharge part 43 is connected to the first opening 117, and is constructed so that the air sent from the downstream air supply pipe 42 is discharged from an air discharge port 43c which is an opening of the other end. The air discharge part 43 is supported by the exterior frame 41 and is formed so as to extend linearly from the exterior frame 41.

The air discharge part 43 includes a cushion mechanism 43a fixed to the exterior frame 41, a shaft part 43b supported by the cushion mechanism 43a, the air discharge port 43c provided to one end of the shaft part 43b, and a seal part 43d provided around the air discharge port 43c. The cushion mechanism 43a is comprised of a coil spring, a linear bush, etc., and supports the shaft part 43b longitudinally pivotable with respect to the exterior frame 41. The shaft part 43b is hollow and is formed so that air supplied from the cushion mechanism 43a side is discharged from the air discharge port 43c. When air is supplied to the grease bath G, the seal part 43d seals the first opening 117 in a state where the air discharge port 43c communicates with the internal space of the grease bath G. The seal part 43d is made of, for example, urethane in order to increase airtightness.

The pressure sensor 44 is provided to the downstream air supply pipe 42. The pressure sensor 44 detects a pressure inside the downstream air supply pipe 42 when the air discharge part 43 is connected to the first opening 117 to detect an internal pressure of the grease bath G. If the air supply mechanism 29 is provided to the downstream air supply pipe 42, the pressure sensor 44 is provided downstream of the air supply mechanism 29 so that pressure data of the grease bath G is acquirable even when the air supply mechanism 29 stops the air supply. The pressure data acquired from the pressure sensor 44 is sent to the robot control device 23 via signal lines (not illustrated).

Figure 3:
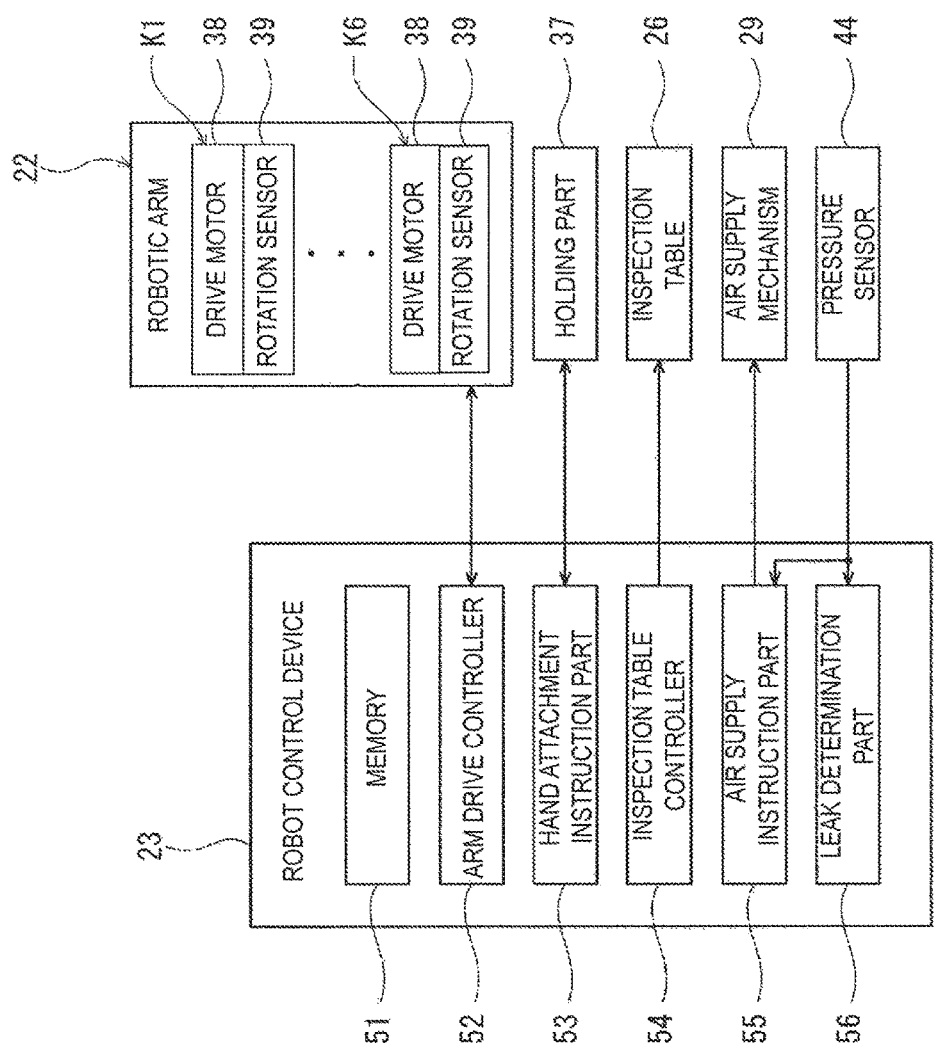
FIG. 3 is a block diagram illustrating a control configuration of a robot control device.

FIG. 3 illustrates a control configuration of the robot control device 23. The robot control device 23 not only controls operation of the robotic arm 22, but also controls the elements related to a series of leak check operations, such as the air supply to the inspection target space and the determination of the leak. The robot control device 23 is comprised of a computing unit, such as a micro controller or a logic circuit, for example. The robot control device 23 includes a memory 51, an arm drive controller 52, a hand attachment instruction part 53, an inspection table controller 54, and an air supply instruction part 55 and a leak determination part 56, and achieves functional blocks 51-56 by the computing unit operating in accordance with program(s) etc. The memory 51 stores various programs and information. In this embodiment, the memory 51 stores positional information on the first opening 117 and the second opening 118 of the articulated robot 100 which are the bodies to be inspected on the inspection table 26, operation program(s) for moving the first opening 117 and the second opening 118 to given positions, etc.

The arm drive controller 52 controls the drive motor 38 etc. based on the operation program(s) stored in the memory 51 so that the hand, such as the air supply hand 4, is moved to a target position and into a target orientation. The rotation sensor 39 transmits an angular displacement signal related to an angular displacement amount of the corresponding drive motor 38 to the arm drive controller 52, and the arm drive controller 52 carries out a feedback control of the operation of the drive motor 38 based on the received angular displacement signal.

The hand attachment instruction part 53 controls attachment and detachment of the hand at the holding part 37 based on the operation program(s) stored in the memory 51. When attaching the hand accommodated in the hand holder 27 to the robotic arm 22, a signal is sent so that the hand attachment instruction part 53 causes the holding part 37 to hold the hand after the holding part 37 contacts the hand. When accommodating the hand attached to the robotic arm 22 in the hand holder 27, the hand attachment instruction part 53 sends a signal to the holding part 37 so that the holding part 37 releases the holding state of the hand in a state where the hand attached to the robotic arm 22 is accommodated in the hand holder 27.

The inspection table controller 54 controls operation of the rotation mechanism of the inspection table 26 based on the operation program(s) stored in the memory 51. The inspection table controller 54 rotates the inspection table 26 to move the first opening 117 and the second opening 118 of the objects to be inspected on the inspection table 26 to the target positions.

The air supply instruction part 55 controls start and stop of the air supply to the air supply hand 4 from the air supply source 24. After the air discharge part 43 of the air supply hand 4 is connected to the first opening 117, the air supply instruction part 55 controls the air supply mechanism 29 to start the air supply. The air supply instruction part 55 monitors the pressure data sent from the pressure sensor 44 after the start of air supply, and when the pressure data exceeds a given value, the air supply instruction part 55 controls the air supply mechanism 29 to stop the air supply.

The leak determination part 56 determines the leak based on the pressure data acquired from the pressure sensor 44 after the lapse of a given period of time from the stop of air supply.

Figure 4:
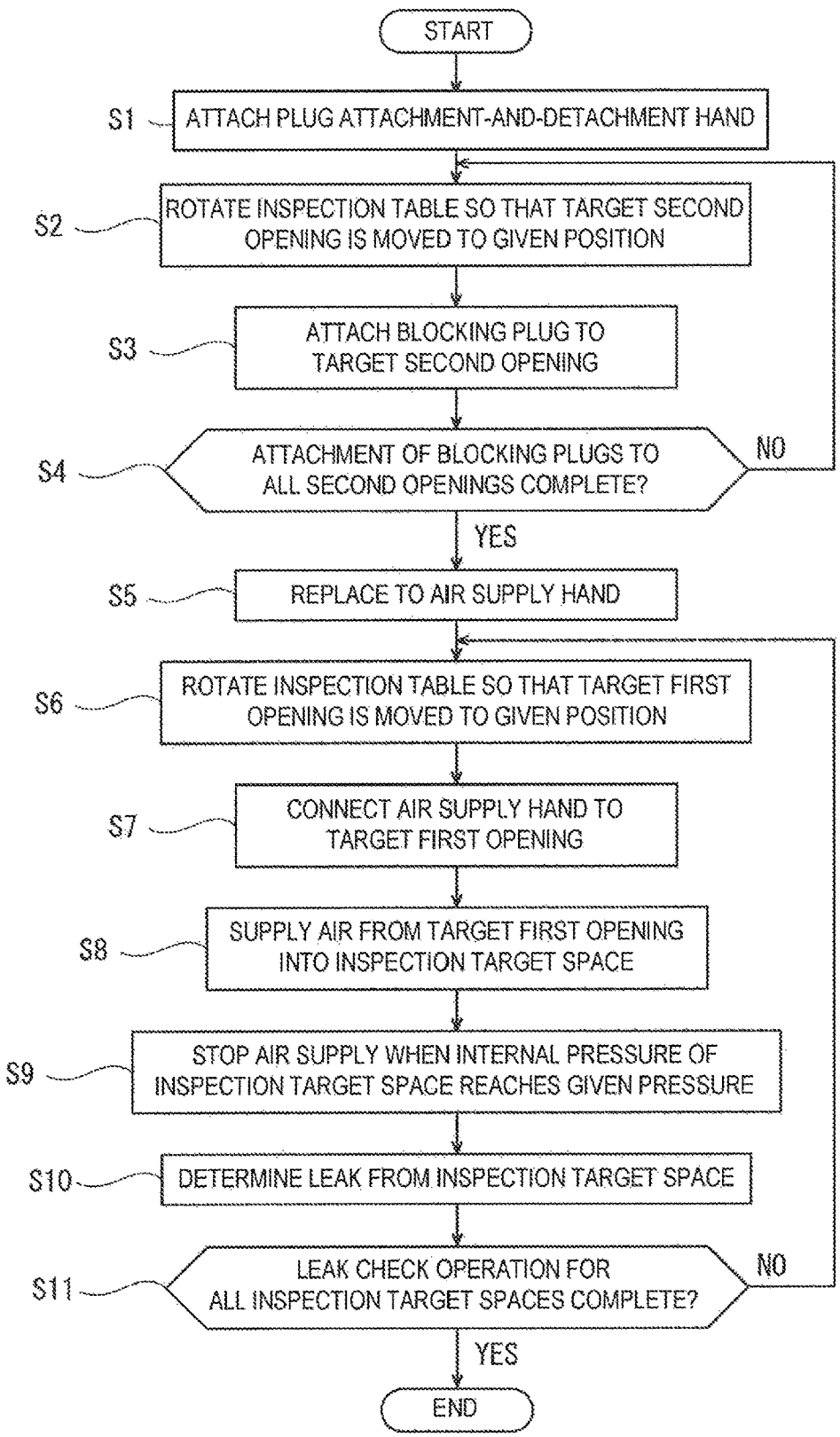
FIG. 4 is a flowchart illustrating a flow of a method of checking leak using the leak check system illustrated in FIG. 1.
Figure 5:
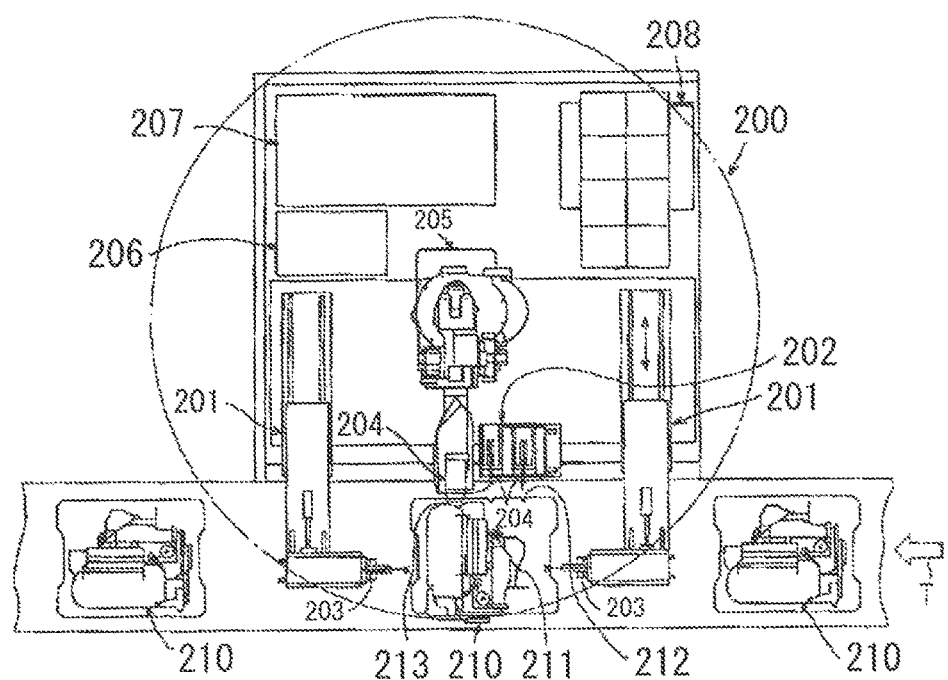
FIG. 5 is a view illustrating a conventional leak check system.

Below, a flow of the method of checking, by using the leak check system 1, the leak from the grease bath G of the articulated robot 100 which is the object to be inspected is described. FIG. 4 is a flowchart illustrating a flow of the method of checking the leak by using the leak check system 1.

The leak check operation by the leak check system 1 according to this embodiment starts in a state where the articulated robot 100 which is the assembled object to be inspected is placed at a given position and in a given orientation on the inspection table 26. The positional information on the first opening 117 and the second opening 118 of the articulated robot 2 which is placed on the inspection table 26 is stored beforehand in the memory 51 of the robot control device 23.

When the instruction indicative of the start of the leak check operation is inputted into the robot control device 23, the robot control device 23 attaches the plug attachment-and-detachment hand 28 to the tip-end part of the robotic arm 22 (Step S1). Specifically, the arm drive controller 52 of the robot control device 23 operates the drive motors 38 etc. of the joint parts K1-K6 to contact the holding part 37 at the tip-end part of the robotic arm 22 to the plug attachment-and-detachment hand 28 accommodated in the hand holder 27. The robot control device 23 then sends the signal so that the holding part 37 holds the plug attachment-and-detachment hand 28 to attach the plug attachment-and-detachment hand 28 to the tip-end part of the robotic arm 22.

Next, the plug attachment-and-detachment hand 28 sequentially attaches the blocking plug 119 to the plurality of second openings 118 provided to the plurality of grease baths G1-G6 which are the objects to be inspected.

Specifically, the robot control device 23 rotates the inspection table 26 so that target one of the plurality of second openings 118 is moved to the given position (Step S2). Note that Step S2 where the inspection table 26 is rotated is preferably omitted if the target second opening 118 is within the operating range of the robotic arm 22 and the blocking plug 119 attachable to the target second opening 118 without rotating the inspection table 26. The robot control device 23 operates the robotic arm 22 to attach the blocking plug 119 to the second opening 118 which is located at the given position or is moved to the given position by the rotation of the inspection table 26 (Step S3).

Steps S2 and S3 are repeated until the attachments of the blocking plugs 119 to all of the second openings 118 are completed (NO at Step S4). Note that, although the order of attaching the blocking plugs is based on the information stored in the memory 51, it does not need to be the order of the grease baths G1-G6.

When the attachments of the blocking plugs 119 to all the second openings 118 are completed (YES at Step S4), the hand attached to the tip-end part of the robotic arm 22 is replaced from the plug attachment-and-detachment hand 28 to the air supply hand 4 on the hand holder 27 (Step S5).

The robot control device 23 then sequentially connects the air supply hand 4 to the plurality of grease baths G1-G6 which are the objects to be inspected, and checks the leak.

Specifically, the robot control device 23 rotates the inspection table 26 so that the first opening 117 of the target grease bath G of the plurality of grease baths G1-G6 moves to the given position (Step S6). Note that Step S6 Where the inspection table 26 is rotated is preferably omitted if the target first opening 117 is within the operating range of the robotic arm 22, and the air discharge part 43 is connectable to the target first opening 117 without rotating the inspection table 26. The robot control device 23 operates the robotic arm 22 to connects the tip end of the shaft part 43b of the air discharge part 43 to the first opening 117 which is located at the given position or is moved to the given position by the rotation of the inspection table 26 (Step S7).

When the connection to the first opening 117 is completed, the robot control device 23 starts the air supply from the air supply source 24 (Step S8). Specifically, the robot control device 23 sends a signal to cause the air supply mechanism 29 to start the air supply and to start the air supply. The robot control device 23 monitors the pressure data of the grease bath G detected with the pressure sensor 44, simultaneously with the supply of air.

When the internal pressure of the grease bath G reaches a given pressure, the robot control device 23 stops the air supply from the air supply source 24 (Step S9). Specifically, the robot control device 23 sends a signal to cause the air supply mechanism 29 to stop the air supply and to stop the air supply.

After the lapse of a given period of time from the stop of the air supply, the robot control device 23 determines the leak based on the internal pressure of the grease bath G, i.e., the pressure data sent from the pressure sensor 44 (Step S10).

Steps S6-S10 are repeated until the leaks of the internal spaces of all of the grease baths G1-G6 are determined (NO at Step S11). When the leaks of the internal spaces of all the grease baths G1-G6 are determined (YES at Step S11), the robot control device 23 ends the leak check operation by the leak check system 1. Note that, although the order of the leak determination is based on the information stored in the memory 51, it does not need to be the order of the grease baths G1-G6.

In the leak check system 1 according to this embodiment, the function of controlling the air supply to the inspection target spaces and the function of determining the leak which are conventionally a responsibility of the leak tester are now a responsibility of the robot control device. Thus, a simplified leak check system is achieved.

Moreover, in the leak check system 1 according to this embodiment, the series of leak check operations which first includes the blocking operation of the second opening 118 which the object to be inspected has, and also includes the connection of the air discharge part 43 to the first opening 117, the air supply to the grease bath G, the monitoring of the internal pressure of the grease bath G, and the determination of the leak, are executable with the control signals from the robot control device 23.

Moreover, in the leak check system 1 according to this embodiment, even if the object to be inspected has the plurality of openings which communicate the inspection target space with the exterior, the single articulated robot 2 carries out the blocking operation of the second openings 11 and the air supply operation from the first openings 117. Thus, it is not necessary to be provided with the same number of mechanical elements as that of the openings. Furthermore, the leak check system 1 according to this embodiment is especially useful in order to simplify the leak check system and shorten the leak check operation, if the single object to be inspected has the plurality of inspection target spaces, and the angle of connecting the hand to the opening differs for each inspection target space, similar to the articulated robot 100.

Furthermore, the object to be inspected is placed on the rotary-driven inspection table 26. Thus, even if the hand of the articulated robot 2 cannot be connected to the opening while the object to be inspected is placed (the position and the orientation), the hand is connectable to all the openings which the object to be inspected has by cooperatively operating the inspection table 26 and the articulated robot 2.

The embodiment is merely an illustration in all points of views, and is not considered to be restrictive. The scope of the present disclosure is indicated by not the above description but the appended claims, and it is intended to include all the changes within the meanings and the scope of equivalents of the claims.

For example, although the embodiment describes that the object to be inspected is the articulated robot 100 and the inspection target space is the internal space of the grease bath G which the articulated robot 100 has, it is not limited to this structure.

Moreover, in the method of checking the leak described in the above embodiment, after attaching the blocking plug 119 to all the second openings 118 for the grease baths G1-G6 (YES at Step S4), the control transits to the process of supplying air to the grease bath G (Steps S5-S8), but it is not limited to this configuration. For example, after completing all the processes of the leak check operation for one grease bath (Steps S1-S11), the control may transit to the attaching process of the blocking plug for another grease bath (Step S1-S3).

DESCRIPTION OF REFERENCE CHARACTERS

1 Leak Check System
2 Articulated Robot
21 Pedestal
22 Robotic Arm
23 Robot Control Device
24 Air Supply Source
25 Upstream Air Supply Pipe
28 Plug Attachment-and-detachment Hand
29 Air Supply Mechanism
31 First Arm Body
32 Second Arm Body
33 Third Arm Body
34 Fourth Arm Body
35 Fifth Arm Body
36 Sixth Arm Body
4 Air Supply Hand
42 Downstream Air Supply Pipe
43 Air Discharge Part
44 Pressure Sensor
100 Articulated Robot (Object to Be Inspected)
117 First Opening
118 Second Opening
119 Blocking Plug
G1-G6 Grease Bath (Inspection Target Space)

What is claimed is:

1. A leak check system configured to supply air to an inspection target space of an object to be inspected and check a leak based on a pressure change of the inspection target space, the leak check system comprising:
   a pedestal;
   a robotic arm including a plurality of arm bodies serially coupled from the pedestal;
   a robot control device configured to control operation of the robotic arm;
   an air supply hand having an air discharge part connected to the object to be inspected to discharge air into the inspection target space, the air supply hand being attachably and detachably attached to a tip-end part of the robotic arm;
   an air supply source;
   an air supply pipe configured to lead air from the air supply source to the air discharge part, the air supply pipe including an upstream air supply pipe and a downstream air supply pipe, the upstream air supply pipe extending from the air supply source to the pedestal and further extending from the pedestal along the robotic arm, the downstream air supply pipe being provided at the air supply hand and including a first end connected to the air discharge part and a second end connected to the upstream air supply pipe when the air supply hand is attached to the tip-end part of the robotic arm;
   a pressure sensor provided to the air supply pipe, the pressure sensor being configured to transmit detected pressure data to the robot control device;
   an air supply mechanism controlled by the robot control device to control supply of air from the air supply source to the air discharge part; and
   a plug attachment-and-detachment hand, wherein:
      the object to be inspected has a plurality of openings that communicate the inspection target space with an exterior of the object, the plurality of openings include a first opening connected to the air discharge part, and at least one second opening, which is different than the first opening, the plug attachment-and-detachment hand is configured to attach a plug to the second opening to block the second opening, the robot control device controls the robotic arm such that the plug is attached to the second opening, the robot control device controls the robotic arm such that after the plug is attached to the second opening, the plug attachment-and-detachment hand is replaced with the air supply hand, the robot control device controls the robotic arm such that the air discharge part is connected to the first opening, the robot control device controls the air supply mechanism such that the discharge of air from the air discharge part to the inspection target space is started, and the robot control device determines the leak from the inspection target space based on the pressure data transmitted by the pressure sensor.

2. The leak check system of claim 1, wherein the object to be inspected has a plurality of inspection target spaces.

3. The leak check system of claim 1, wherein the object to be inspected is an articulated robot, and the inspection target space is an internal space of a grease bath included in the articulated robot.

4. A method of checking a leak from the object to be inspected having a plurality of openings that communicate the inspection target space with the exterior by using the leak check system of claim 1, the plurality of openings including the first opening to which the air discharge part is connected, and the at least one second opening, the method comprising:

controlling the robotic arm by the robot control device to connect the air discharge part to the first opening;

controlling the air supply mechanism by the robot control device to start discharging of air from the air discharge part to the inspection target space; and determining the leak from the inspection target space by the robot control device based on pressure data transmitted from the pressure sensor.

5. The method of claim 4, further comprising:

before connecting the air discharge part to the first opening, controlling the robotic arm by the robot control device for the second opening to attach to the tip-end part of the robotic arm, the plug attachment-and-detachment hand being configured to attach the plug to the second opening that blocks the second opening; and controlling the robotic arm by the robot control device to attach the plug to the second opening.

* * * * *